US012803947B2

(12) United States Patent
Wang et al.

(10) Patent No.: US 12,803,947 B2
(45) Date of Patent: Nov. 17, 2026

(54) RULE PROCESSING METHOD, COMMUNICATION DEVICE, AND NETWORK SIDE DEVICE

(71) Applicant: VIVO MOBILE COMMUNICATION CO., LTD., Dongguan (CN)

(72) Inventors: Wen Wang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 39 days.

(21) Appl. No.: 19/021,263

(22) Filed: Jan. 15, 2025

(65) Prior Publication Data

US 2025/0158954 A1 May 15, 2025

Related U.S. Application Data

(63) Continuation of application No. PCT/CN2023/107530, filed on Jul. 14, 2023.

(30) Foreign Application Priority Data

Jul. 20, 2022 (CN) ........................ 202210862222.9

(51) Int. Cl.
*G06F 15/16* (2006.01)
*H04L 61/103* (2022.01)

(52) U.S. Cl.
CPC .................................. *H04L 61/103* (2013.01)

(58) Field of Classification Search
CPC ... H04L 61/103; H04L 12/2834; H04L 12/66; H04L 45/741; H04L 45/85; H04L 61/5007; H04L 61/00; H04L 61/5014; H04L 12/2816; H04L 69/322; H04W 40/22
See application file for complete search history.

(56) References Cited

U.S. PATENT DOCUMENTS

| | | | | |
|---|---|---|---|---|
| 2021/0368341 | A1 | 11/2021 | Liao | |
| 2022/0338050 | A1* | 10/2022 | Liu | H04W 36/0033 |
| 2024/0080708 | A1* | 3/2024 | Rao | H04W 28/0268 |

(Continued)

OTHER PUBLICATIONS

First Office Action dated Jun. 26, 2026 received in corresponding patent family Chinese application No. CN202210862222.9.

(Continued)

*Primary Examiner* — John B Walsh

(57) ABSTRACT

This application discloses a rule processing method, a communication device, and a network side device, and belongs to the field of wireless communication. The rule processing method in embodiments of this application includes: receiving, by a first device, first information sent by a first network function, where the first information includes at least one of the following: a first mapping rule and a first allocation rule; and the first information is used by the first device to perform a first operation based on the first information, where the first operation includes at least one of the following: forwarding data sent by a second device to a network side device; allocating an IP address to the second device; and sending the IP address to the second device, where the second device interacts with the first device through a non-3GPP access technology.

18 Claims, 7 Drawing Sheets

(56) References Cited

U.S. PATENT DOCUMENTS

2025/0097779 A1* 3/2025 Qiang .................. H04W 28/24

OTHER PUBLICATIONS

Extended European Search Report dated Sep. 12, 2025 received in corresponding patent family European Application No. EP23842230.7.

International Search Report dated Sep. 21, 2023 in International Application No. PCT/CN2023/107530. English translation attached.

Written Opinion of the International Search Authority dated Sep. 21, 2023 in International Application No. PCT/CN2023/107530. English translation attached.

3rd Generation Partnership Project; Technical Specification Group Services and System Aspects; Study on architecture enhancements for Personal IoT Network (PIN) (Release 18), 3GPP Standard; Technical Report; 3GPP TR 23.700-88, May 27, 2022 (May 7, 2022), pp. 1-113, XP052182985.

Zhenhua Xie et al.: "Mega editorial modification on TR 23.700-88 v.0.2.0", 3GPP Draft; S2-2204141; Type PCR; FS_PIN, 3rd Generation Partnership Project (3GPP), May 6, 2022 (May 6, 2022), XP052167514.

Qualcomm Incorporated."Solution of authorization and management of PIN and PIN Elements", 3GPP TSG-SA WG2#150E e-meeting S2-2203520, Apr. 12, 2022 (Apr. 12, 2022), section 6.x.

Qualcomm Incorporated."Solution of authorization and management of PIN and PIN Elements", 3GPP TSG-SA WG2#150E e-meeting S2-2202028, Apr. 12, 2022 (Apr. 12, 2022), section 6.x.2.

* cited by examiner

RULE PROCESSING METHOD, COMMUNICATION DEVICE, AND NETWORK SIDE DEVICE

CROSS-REFERENCE TO RELATED APPLICATIONS

This application is a continuation of International Patent Application No. PCT/CN2023/107530, filed on Jul. 14, 2023, which claims priority to Chinese Patent Application No. 202210862222.9, filed with the China National Intellectual Property Administration on Jul. 20, 2022 and entitled "RULE PROCESSING METHOD, COMMUNICATION DEVICE, AND NETWORK SIDE DEVICE", which is incorporated herein by reference in its entirety.

TECHNICAL FIELD

This application belongs to the field of wireless communication technologies, and specifically, to a rule processing method, a communication device, and a network side device.

BACKGROUND

In the related art, a first device that accesses the non-3rd generation partnership project (3GPP) may interact with a second device (which may be referred to as a control gateway) through a non-3GPP access technology, thereby communicating with a network side via the second device. For example, in the personal internet of things, personal internet of things devices (where household devices are used as an example, such as a television, an air conditioner, and a sweeping robot) can access a network via a control gateway in the personal internet of things. The personal internet of things devices access the control gateway through technologies such as Bluetooth and Wi-Fi, and the control gateway then accesses a network through the 3GPP technology. This allows the personal internet of things devices to access the network through the control gateway to obtain network services and data. The control gateway in the personal internet of things may be a gateway in a smart home scenario, which may appear in the form of User Equipment (UE) with authentication of an operator.

In this application, a scenario in which different first devices may access the network via the same second device is considered. For example, in the personal internet of things, a speaker, a television, and a sweeping robot may access the network via the same UE. However, functions of different first devices may be different, and the first device that accesses the network via the second device needs to obtain related address information and/or perform differentiated processing on data of different functions, to ensure that data of the first device can be successfully transmitted and processed through the personal internet of things.

SUMMARY

According to a first aspect, a rule processing method is provided, including: receiving, by a first device, first information sent by a first network function, where the first information includes at least one of the following: a first mapping rule or a first allocation rule; and the first information is used by the first device to perform a first operation based on the first information, where the first operation includes at least one of the following: forwarding data sent by a second device to a network side device; allocating an IP address to the second device; or sending the IP address to the second device, where the second device interacts with the first device through a non-3GPP access technology.

According to a second aspect, a rule processing apparatus is provided, applied to a first device, and the apparatus including: a first receiving module, configured to receive first information sent by a network side, where the first information includes at least one of the following: a first mapping rule or a first allocation rule; and a first execution module, configured to perform a first operation based on the first information, where the first operation includes at least one of the following: forwarding data sent by a second device to a network side device; allocating an IP address to the second device; or sending the IP address to the second device, where the second device interacts with the first device through a non-3GPP access technology.

According to a third aspect, a rule processing method is provided, including: sending, by a first network function, first information to a first device, where the first information includes at least one of the following: a first mapping rule or a first allocation rule, where the first mapping rule instructs the first device to forward, based on the first mapping rule, data sent by a second device to a network side device; the first allocation rule instructs the first device to allocate, based on the first allocation rule, an IP address to the second device and/or send the IP address to the second device; and the second device interacts with the first device through a non-3GPP access technology.

According to a fourth aspect, a rule processing apparatus is provided, including: a first obtaining module, configured to obtain first information, where the first information includes at least one of the following: a first mapping rule or a first allocation rule; and a first sending module, configured to send the first information to a first device, where the first mapping rule instructs the first device to forward, based on the first mapping rule, data sent by a second device to a network side device; the first allocation rule instructs the first device to allocate, based on the first allocation rule, an IP address to the second device and/or send the IP address to the second device; and the second device interacts with the first device through a non-3GPP access technology.

According to a fifth aspect, a rule processing method is provided, including: sending, by a second network function, second information to a first network function, where the second information includes at least one of the following: a mapping rule indication; a second mapping rule; or a first allocation rule, where the mapping rule indication instructs the first network function to obtain a first mapping rule corresponding to a target identifier; the second mapping rule instructs the first network function to send the first mapping rule to a first device based on the second mapping rule; the first allocation rule is used by the first network function to indicate the first device to allocate, based on the first allocation rule, an IP address to a second device and/or send the IP address to the second device; and the second device interacts with the first device through a non-3GPP access technology.

According to a sixth aspect, a rule processing apparatus is provided, including: a second obtaining module, configured to obtain second information; and a second sending module, configured to send the second information to a first network function, where the second information includes at least one of the following: a mapping rule indication; a second mapping rule; or a first allocation rule, where the mapping rule indication instructs the first network function to obtain a first mapping rule corresponding to a target identifier; the second mapping rule instructs the first network function to send the first mapping rule to a first device based on the second mapping rule; the first allocation rule is used by the first network function to indicate the first device to allocate, based on the first allocation rule, an IP address to a second device and/or send the IP address to the second device; and the second device interacts with the first device through a non-3GPP access technology.

According to a seventh aspect, a communication device is provided. The communication device includes a processor and a memory, the memory stores a program or instructions executable on the processor, and the program or the instructions, when executed by the processor, implement the steps of the method according to the first aspect.

According to an eighth aspect, a communication device is provided, including a processor and a communication interface, where the processor is configured to implement the steps of the method according to the first aspect, and the communication interface is configured to communicate with an external device.

According to a ninth aspect, a network side device is provided, where the network side device includes a processor and a memory. The memory stores a program or instructions executable on the processor, and when the program or instructions are executed by the processor, the steps of the method according to the third aspect are implemented, or the steps of the method according to the fifth aspect are implemented.

According to a tenth aspect, a network side device is provided, including a processor and a communication interface, where the processor is configured to implement the steps of the method according to the third aspect, or implement the steps of the method according to the fifth aspect, and the communication interface is configured to communicate with an external device.

According to an eleventh aspect, a rule processing system is provided, including a communication device and a network side device. The communication device can be configured to perform the steps of the method according to the first aspect, the network side device includes a first network side device and/or a second network side device, the first network side device can be configured to perform the steps of the method according to the third aspect, and the second network side device can be configured to perform the steps of the method according to the fifth aspect.

According to a twelfth aspect, a readable storage medium is provided, storing a program or instructions, where the program or instructions, when executed by a processor, implement the steps of the method according to the first aspect, or implement the steps of the method according to the third aspect, or implement the steps of the method according to the fifth aspect.

According to a thirteenth aspect, a chip is provided, including a processor and a communication interface, where the communication interface is coupled to the processor, and the processor is configured to run a program or instructions, to implement the steps of the method according to the first aspect, or implement the steps of the method according to the third aspect, or implement the steps of the method according to the fifth aspect.

According to a fourteenth aspect, a computer program/program product is provided, where the computer program/program product is stored in a storage medium, and the program/program product, when executed by at least one processor, implements the steps of the method according to the first aspect, or implements the steps of the method according to the third aspect, or implements the steps of the method according to the fifth aspect.

DETAILED DESCRIPTION

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, terms “first” and “second” are used to distinguish similar objects, but are not used to describe a specific sequence or order. It should be understood that the terms used in such a way is interchangeable in proper circumstances, so that embodiments of this application can be implemented in other sequences than the sequence illustrated or described herein. In addition, objects distinguished by “first” and “second” are usually of a type, and the number of objects is not limited. For example, a first object may be one or more than one. In addition, in the specification and claims, “and/or” means at least one of the connected objects, and the character “/” generally indicates an “or” relation between associated objects.

It should be noted that, the technology described in embodiments of this application is not limited to a Long Term Evolution (LTE)/LTE evolution (LTE-Advanced, LTE-A) system, but may be further used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms “system” and “network” in embodiments of this application are often used interchangeably, and the described technologies may be used both for the systems and radio technologies mentioned above and may also be used for other systems and radio technologies. The following descriptions describe a New Radio (NR) system for the objective of being used as an example, and NR terms are used in most of the descriptions below. However, these technologies may also be applied to applications other than NR system applications, such as a 6th Generation (6G) communication system.

Figure 1:
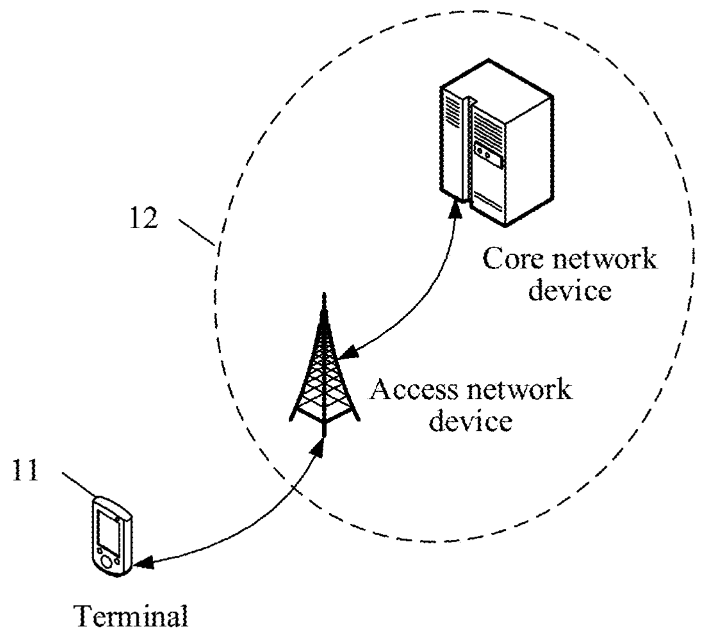
FIG. 1 is a block diagram of a wireless communication system applicable to an embodiment of this application.

FIG. 1 is a block diagram of a wireless communication system applicable to an embodiment of this application. The wireless communication system includes a terminal 11 and a network side device 12. The terminal 11 may be a terminal side device such as a mobile phone, a Tablet Personal Computer, a Laptop Computer, or referred to as a notebook computer, a Personal Digital Assistant (PDA), a palmtop computer, a netbook, an ultra-mobile personal computer (UMPC), a Mobile Internet Device (MID), an augmented reality (AR)/virtual reality (VR) device, a robot, a Wearable Device, Vehicle User Equipment (VUE), Pedestrian User Equipment (PUE), a smart home (a home device with a wireless communication function, such as a refrigerator, a television, a washing machine, or a piece of furniture), a game console, a personal computer (PC), a cash machine, or a self-service machine. The wearable device includes: a smart watch, a smart bracelet, smart headphones, smart glasses, smart jewelry (a smart bracelet, a smart bracelet, a smart ring, a smart necklace, a smart anklet, a smart anklet, and the like), a smart wristband, smart clothing, and the like. It should be noted that in embodiments of this application, a specific type of the terminal 11 is not limited. The network side device 12 may include an access network device and/or a core network device. The access network device 12 may also be referred to as a radio access network device, a Radio Access Network (RAN), a radio access network function, or a radio access network unit. The access network device 12 may include a base station, a WLAN access point, a Wi-Fi node, or the like. The base station may be referred to as a NodeB, an evolved NodeB (eNB), an access point, a Base Transceiver Station (BTS), a radio base station, a radio transceiver, a Basic Service Set (BSS), an Extended Service Set (ESS), a household NodeB, a household evolution NodeB, a Transmission Reception Point (TRP), or some other proper terms in the field. Provided that the same technical effect is achieved, the base station is not limited to a specific technical vocabulary. It should be noted that, in the embodiments of this application, only a base station in the NR system is used as an example for description, and a specific type of the base station is not limited. The core network device may include, but is not limited to, at least one of the following: a core network node, a core network function, a Mobility Management Entity (MME), an Access and Mobility Management Function (AMF), a Session Management Function (SMF), a User Plane Function (UPF), a Policy Control Function (PCF), a Policy and Charging Rule Function (PCRF), an Edge Application Server Discovery Function (EASDF), Unified Data Management (UDM), Unified Data Repository (UDR), a Home Subscriber Server (HSS), a Centralized network configuration (CNC), a Network Repository Function (NRF), a Network Exposure Function (NEF), a Local NEF (L-NEF), a Binding Support Function (BSF), an Application Function (AF), and the like. It should be noted that, in the embodiments of this application, a core network device in the NR system is only used as an example for description, and a specific type of the core network device is not limited.

Figure 2:
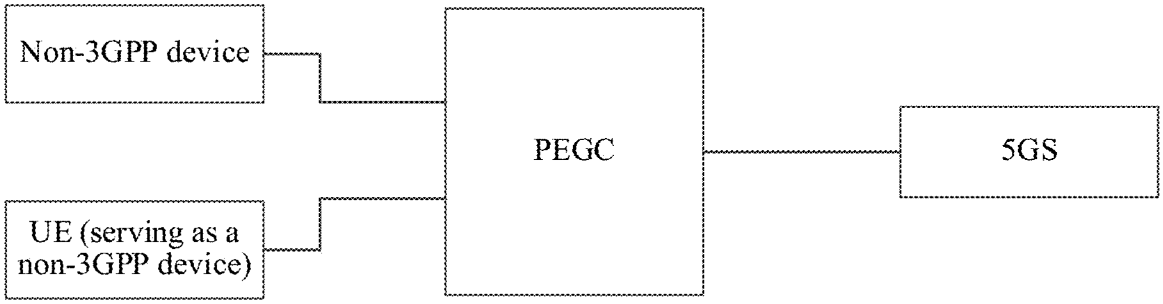
FIG. 2 is a schematic diagram of a personal internet of things applicable to an embodiment of this application.

FIG. 2 is a schematic diagram of an architecture of a personal internet of things applicable to an embodiment of this application. As shown in FIG. 2, in the personal internet of things, the personal internet of things equipment (Personal IoT Network Equipment, PINE) accesses a 5th generation (5th Generation System, 5GS) network through a control gateway (PIN Element with Gateway Capability, PEGC) in the personal internet of things. A personal internet of things device may access the PEGC through technologies such as Bluetooth and Wi-Fi, and the PEGC may then access a network through a 3GPP technology.

However, currently in the related art, it cannot be ensured that the data of the first device can be successfully transmitted and processed through the personal internet of things.

Embodiments of this application provide a rule processing method, a communication device, and a network side device, to resolve a technical problem that the foregoing related art cannot ensure that a first device can successfully implement data transmission and processing through a personal internet of things.

In the embodiments of this application, in a scenario in which the second device interacts with the first device through the non-3GPP access technology, the first device receives the first information from the network side, and the first information includes the first mapping rule and/or the first allocation rule. The first device may forward, based on the first information, the data sent by the second device to the network side device and/or allocate the IP address to the second device and/or send the IP address to the second device. In this way, the first device may route data sent by different accessed second devices and/or allocate IP addresses to different accessed second devices, so that the first device can effectively implement data transmission and processing through the personal internet of things.

The rule processing solution provided in embodiments of this application is described in detail below by using some embodiments and application scenarios with reference to the accompanying drawings.

Figure 3:
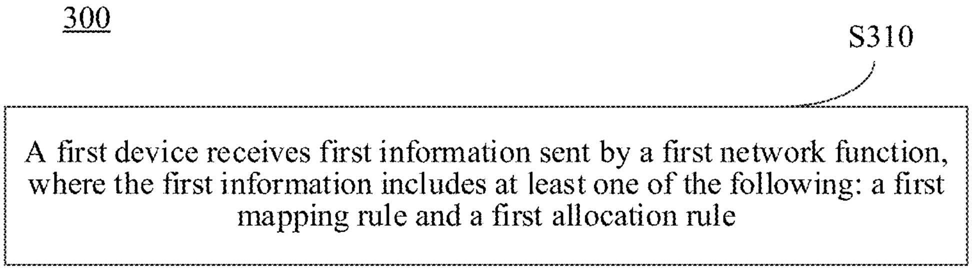
FIG. 3 is a schematic flowchart of a rule processing method according to an embodiment of this application.

FIG. 3 is a schematic flowchart of a rule processing method according to an embodiment of this application. The method 300 may be performed by a first device. In other words, the method may be performed by software or hardware installed on the first device. As shown in FIG. 3, the method may include the following steps.

S310: A first device receives first information sent by a first network function, where the first information includes at least one of the following: a first mapping rule or a first allocation rule.

In the embodiments of this application, the first information is used by the first device to perform a first operation based on the first information, where the first operation includes at least one of the following:

forwarding data sent by a second device to a network side device, where the second device interacts with the first device through a non-3GPP access technology;

allocating an IP address to the second device; or sending the IP address to the second device.

In the embodiments of this application, after the first device receives the first information, when receiving the data sent by the second device to the network side device, the first device may forward the data to the network side device based on the first mapping rule. For example, the first device may transmit the data through a target Protocol Data Unit (PDU) based on the first mapping rule, where the target PDU is a PDU determined based on the first mapping rule.

In the embodiments of this application, the first mapping rule may include one or more.

In the embodiments of this application, the first network function may be a network element on a network side, for example, the first network function may be a PCF or a personal internet of things network management function (Personal IT Network management function, PINMF).

For example, the first mapping rule may include first session description information, and the first device may obtain, based on the first mapping rule, a target PDU that matches the first session description information.

In a possible implementation, the first session description information may include at least one of the following:

(1) a data network name (DNN);

(2) information related to a network slice, such as Single Network Slice Selection Assistance Information (S-NSSAI); or (3) service continuity mode information, for example, a Session and Service Continuity (SSC) mode.

In a possible implementation, to correctly route data sent by different second devices, the first mapping rule may further include an association relationship between first association information and the first session description information, where the first association information may include at least one of the following:

(1) a source IP address, where when forwarding the data sent by the second device, the first device may determine the corresponding first session description information according to a source IP address of the data, and then transmit the data through a target PDU session corresponding to the first session description information;

(2) a source IP address range, where when forwarding the data sent by the second device, the first device may determine the corresponding first session description information according to a source IP address range that matches the source IP address of the data, and then transmit the data through the target PDU session corresponding to the determined first session description information;

(3) a target IP address, where when forwarding the data sent by the second device, the first device may determine the corresponding first session description information according to a target IP address of the data, and then transmit the data through the target PDU session corresponding to the first session description information;

(4) a target IP address range, where when forwarding the data sent by the second device, the first device may determine the corresponding first session description information according to a target IP address range that matches the target IP address of the data, and then transmit the data through the target PDU session corresponding to the determined first session description information;

(5) a source Medium Access Control (MAC) address, where when forwarding the data sent by the second device, the first device may determine the corresponding first session description information according to a source MAC address of the data, and then transmit the data through the target PDU session corresponding to the determined first session description information;

(6) a source MAC address range, where when forwarding the data sent by the second device, the first device may determine the corresponding first session description information according to a source MAC address range matched by the source MAC address of the data, and then transmit the data through the target PDU session corresponding to the determined first session description information;

(7) a target MAC address, where when forwarding the data sent by the second device, the first device may determine the corresponding first session description information according to a target MAC address of the data, and then transmit the data through the target PDU session corresponding to the first session description information;

(8) a target MAC address range, where when forwarding the data sent by the second device, the first device may determine, according to a target MAC address range that matches the target MAC address of the data, first session description information corresponding to the target MAC address range, and then transmit the data through the target PDU session corresponding to the determined first session description information;

(9) a Service Set Identifier (SSID), where the SSID identifies different wireless Access Points (APs), and when forwarding the data sent by the second device, the first device determines first session description information corresponding to the SSID that is used when the second device is connected to the first device, and then transmits the data through the target PDU session corresponding to the determined first session description information;

(10) a Bluetooth identifier, where when forwarding the data sent by the second device, the first device determines first session description information corresponding to the Bluetooth identifier that is used when the second device connects to the first device, and then transmits the data through the target PDU session corresponding to the determined first session description information;

(11) a source port number, where when forwarding the data sent by the second device, the first device determines first session description information corresponding to a source port number of the data, and then transmits the data through the target PDU session corresponding to the determined first session description information;

(12) a source port range, where when forwarding the data sent by the second device, the first device obtains a source port range that matches the source port number of the data, determines first session description information corresponding to the obtained source port range, and then transmits the data through the target PDU session corresponding to the determined first session description information;

(13) a target port number, where when forwarding the data sent by the second device, the first device determines first session description information corresponding to the target port number of the data, and then transmits the data through the target PDU session corresponding to the determined first session description information;

(14) a target port range, where when forwarding the data sent by the second device, the first device obtains a target port range that matches the target port number of the data, determines first session description information corresponding to the obtained target port range, and then transmits the data through the target PDU session corresponding to the determined first session description information;

(15) protocol information of data, where when forwarding the data sent by the second device, the first device determines first session description information corresponding to a data protocol used by the data, and then transmits the data through the target PDU session corresponding to the determined first session description information; or

(16) a default indication for indicating any data. For example, the first mapping rule includes an association relationship between the default indication and the first session description information, indicating that any data may be transmitted through the PDU session corresponding to the first session description information.

The first mapping rule may include an association relationship between the foregoing at least one item and the first session description information.

In a possible implementation, the transmitting, by the first device, the data through a target PDU session based on the first mapping rule may include: transmitting, by the first device, the data through the target PDU session based on the first mapping rule and data attribute information of the data, where the target PDU session corresponds to the first session description information. For example, the first device may obtain, according to the first mapping rule, first session description information that matches the data attribute information of the data, and transmit the data through the target PDU session corresponding to the obtained first session description information.

In the foregoing possible implementation, corresponding to the first association information, the data attribute information includes but is not limited to at least one of the following:

(1) a source IP address, namely, a source IP address of to-be-forwarded data;

(2) a target IP address, namely, a target IP address of the to-be-forwarded data;

(3) an SSID used by the second device when connecting to the first device, for example, both the first device and the second device may be hotspots or Bluetooth broadcasters, and the data attribute information of the data includes the SSID used by the second device when connecting to the first device;

(4) a Bluetooth identifier used by the second device when connecting to the first device;

(5) a source MAC address, namely, a source MAC address of the to-be-forwarded data;

(6) a target MAC address, namely, a target MAC address of the to-be-forwarded data;

(7) a source port number, namely, a source port number of the to-be-forwarded data;

(8) a target port number, namely, a target port number of the to-be-forwarded data; or (9) the protocol information of the data, namely, the data protocol used by the to-be-forwarded data.

In a possible implementation, the first mapping rule may further include priority information, the priority information indicates a priority of the first mapping rule, and when there are a plurality of first mapping rules, the first device uses the first mapping rule based on priorities of the first mapping rules. For example, when there are a plurality of first mapping rules, and when forwarding the data of the second device, the first device may first select a first mapping rule with a highest priority in descending order of a priority. If the first mapping rule does not include the first session description information associated with the data attribute information of the to-be-forwarded data, a first mapping rule with a second highest priority may be used. Based on the first mapping rule with the second highest priority, the first session description information associated with the data attribute information of the to-be-forwarded data is obtained. Alternatively, a correspondence between related information of the second device and the priority may be set, and the first device may select, according to the related information of the second device, such as a connection manner and a service type, a first mapping rule with a corresponding priority to forward the data of the second device.

In one or more of the foregoing possible implementations, the target PDU session may be an established target PDU session or a newly established target PDU session. For example, when the first device forwards the data of the second device, if the target PDU session corresponding to the first session description information has been established currently, the to-be-forwarded data is transmitted through the target PDU session. If the target PDU session corresponding to the first session description information has not been established currently, the target PDU session is established and the to-be-forwarded data is transmitted through the newly established target PDU session.

In the embodiments of this application, after the first device receives the first information, when the IP address needs to be allocated to the second device, the IP address may be allocated to the second device and/or the IP address may be sent to the second device based on the first allocation rule. For example, after registering with a personal internet of things management function (PINMF), the first device may receive the first information, and then allocate the IP address to the second device that accesses the first device and/or send the IP address to the second device. For example, the first device may first allocate the IP address to the second device according to the first allocation rule and send the IP address to the second device, or the first device may determine the IP address to be sent to the second device according to the first allocation rule and send the IP address to the second device.

In a possible implementation, the first allocation rule includes dynamic host configuration protocol DHCP service address information or at least one of the following:

(1) address range information, where the first device may allocate the IP address to the second device within an address range indicated by the address range information, and/or the first device may select one IP address from the address range and send the IP address to the second device; or (2) address mapping information, where the first device may allocate the IP address to the second device according to the address mapping information, and/or the first device obtains the IP address to be sent to the second device according to the address mapping information and send the IP address to the second device.

The address mapping information includes any one of the following:

(1) a correspondence between a MAC address and the IP address, where the first device may obtain, according to a MAC address of the second device, an IP address corresponding to the MAC address of the second device;

(2) a correspondence between the MAC address and an IP address range, where the first device may obtain, according to the MAC address of the second device, an IP address within an IP address range corresponding to the MAC address of the second device; and (3) a correspondence between a MAC address range and the IP address range, where the first device may obtain, according to the MAC address of the second device, a MAC address range that matches the MAC address of the second device, and then obtain the IP address within the IP address range corresponding to the obtained MAC address range.

Through the foregoing possible implementation, corresponding IP addresses may be allocated to different second devices and/or corresponding IP addresses may be sent based on the first allocation rule, to facilitate subsequent management of the second devices.

In a possible implementation, when the first allocation rule includes the DHCP service address information, that the first device performs the first operation based on the first allocation rule may include: forwarding, by the first device, a DHCP message sent by the second device to a DHCP server indicated by the DHCP service address information, or forwarding a DHCP message sent by a DHCP server to the second device. For example, after receiving the DHCP message sent by the second device, the first device forwards the DHCP message to the DHCP server indicated by the DHCP service address information, and the DHCP server allocates the IP address to the second device and/or sends the IP address to the second device. Alternatively, the second device sends the DHCP message to the DHCP server. After allocating the IP address to the second device, the DHCP server returns the DHCP message to the first device. The first device determines that the DHCP server that sends the DHCP message is the DHCP server indicated by the DHCP service address information, and forwards the DHCP message to the second device. Through this possible implementation, the DHCP service address information is included in the first allocation rule, so that the DHCP server may allocate the IP address to the second device and/or send the IP address to the second device.

Through the technical solution provided in the embodiments of this application, the first device can map the data of different second devices to the corresponding PDU sessions, to correctly route the data. In addition, the first device may further implement allocation and/or sending of the IP address of the second device.

In the embodiments of this application, the first information received by the first device may be sent by the first network function (for example, the PCF or the PINMF). Based on the same concept of the embodiments of this application, the embodiments of this application further provide another rule processing method.

Figure 4:
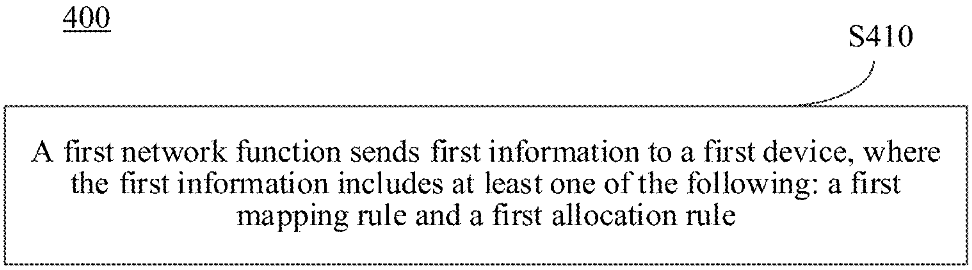
FIG. 4 is a schematic flowchart of another rule processing method according to an embodiment of this application.

FIG. 4 is a schematic flowchart of another rule processing method according to an embodiment of this application. As shown in FIG. 4, the method 400 mainly includes the following steps.

S410: A first network function sends first information to a first device, where the first information includes at least one of the following: a first mapping rule or a first allocation rule.

In the embodiments of this application, the first mapping rule instructs the first device to forward, based on the first mapping rule, data sent by a second device to a network side device; the first allocation rule instructs the first device to allocate, based on the first allocation rule, an IP address to the second device and/or send the IP address to the second device; and the second device interacts with the first device through a non-3GPP access technology.

The first information is the same as the first information in the method 300. For details, refer to related descriptions in the method 300.

In a possible implementation, the first allocation rule includes DHCP service address information or at least one of the following:

(1) address range information, where the information indicates the first device to allocate the IP address to the second device within an address range indicated by the address range information, and/or send the IP address within the address range to the second device; or (2) address mapping information, where the address mapping information indicates the first device to allocate the IP address to the second device and/or send the IP address to the second device according to the information, where the address mapping information includes any one of the following:

(1) a correspondence between a MAC address and the IP address, where the address mapping information indicates the first device to allocate and/or send an IP address corresponding to the MAC address to the second device according to the MAC address of the second device;

(2) a correspondence between the MAC address and an IP address range, where the address mapping information indicates the first device to allocate and/or send, according to the MAC address of the second device, the IP address within an IP address range corresponding to the MAC address to the second device; and (3) a correspondence between a MAC address range and the IP address range, where the address mapping information indicates the first device to allocate and/or send, according to the MAC address range to which the MAC address of the second device belongs, the IP address within the IP address range corresponding to the MAC address range to the second device.

In a possible implementation, when the first allocation rule includes the DHCP service address information, the DHCP service address information is related to the first network function, and the method further includes: performing, by the first network function, a second operation based on information related to the second device, where the second operation includes at least one of the following:

allocating the IP address to the second device; or sending the IP address to the second device.

For example, if the first network function has a DHCP server function or the first network function and the DHCP server are in a same merged network element, the first network function includes the DHCP service address information in the first allocation rule, that is, the DHCP service address information indicates the first device to forward a DHCP message sent by the second device to a DHCP server (where the DHCP server is the first network function in this possible implementation) corresponding to the DHCP service address information or to forward the DHCP message sent by the DHCP server corresponding to the DHCP service address information to the second device. In addition, the first network function may allocate the IP address to the second device and/or send the IP address to the second device according to information related to the second device, such as one or more of the MAC address of the second device, supported service information, a recommended QoS requirement, device type information, and the like.

When the first network function does not have the DHCP server function or the first network function and the DHCP server are respectively set in independent network elements, the first network function includes the DHCP service address information in the first allocation rule, that is, the DHCP service address information indicates the first device to forward the DHCP message sent by the second device to the DHCP server corresponding to the DHCP service address information or forward the DHCP message sent by the DHCP server corresponding to the DHCP service address information to the second device. When receiving a first address obtaining request from a third network function (the DHCP server), the first network function allocates the IP address to the second device according to the information related to the second device and returns the IP address to the third network function.

In a possible implementation, the first network function may also perform the second operation based on the information related to the second device and with reference to the first mapping rule. For example, the first network function may determine, based on information related to the second device and with reference to the first mapping rule, first session description information corresponding to the data of the second device, and allocate the IP address to the second device and/or send the IP address to the second device according to the first session description information.

For example, when the first network function has the DHCP server function or the first network function and the DHCP server are in a same merged network element, the first network function may determine, after receiving a DHCP message of a PIN device, a type of the PIN device and one or more of a corresponding DNN/network slice, an IP range, and the like according to a MAC address of the PIN device, and then send an IP address or an IP range of the PIN device to the PIN device according to the information.

When the first network function does not have the DHCP server function or the first network function and the DHCP server are respectively set in the independent network elements, the first network function may receive the first address obtaining request from the third network function (the DHCP server). The first address obtaining request includes MAC addresses of one or more PIN devices. The first network function determines a type of the PIN device, and at least one of a corresponding DNN/network slice, an IP range, and the like based on the MAC address, and then sends a first address obtaining request reply to the third network function according to the information. The reply message includes the IP address or the IP range of the PIN device.

In a possible implementation, the first mapping rule may include first session description information, and the first session description information includes at least one of the following:

a DNN;

information related to a network slice; or service continuity mode information.

In a possible implementation, the first mapping rule further includes an association relationship between first association information and the first session description information, and the first association information includes at least one of the following:

a source IP address;

a source IP address range;

a target IP address;

a target IP address range;

a source MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, the first mapping rule further includes priority information, the priority information indicates a priority of the first mapping rule, and when there are a plurality of first mapping rules, the first device uses the first mapping rule based on priorities of the first mapping rules.

The first mapping rule in the embodiments of this application is the same as the first mapping rule in the method 300. For details, refer to related descriptions in the method 300.

In a possible implementation, before S410, the method may further include: receiving, by the first network function, second information from a second network function, where the second information includes at least one of the following:

(1) a mapping rule indication, instructing the first network function to obtain a first mapping rule corresponding to the target identifier, where the mapping rule indication may include at least one of the following target identifiers: a terminal device identifier and a group identifier, for example, the mapping rule indication may include a PEGC identifier or a PEGC group identifier, and the first network function may include, according to the mapping rule indication, a first mapping rule corresponding to a PEGC or a PEGC group corresponding to the PEGC identifier or the PEGC group identifier;

(2) a second mapping rule, where the second mapping rule instructs the first network function to send the first mapping rule to the first device based on the second mapping rule, for example, the second mapping rule may be the same as the first mapping rule, including the first session description information and/or the association relationship between the first session description information and the first association information; or (3) the first allocation rule, namely, the first allocation rule included in the first information, for example, the first network function may be a PCF, the first network function may be a PINMF, and the first network function may send the first information to the first device according to the second information sent by the second network function.

In a possible implementation, the second mapping rule may include second session description information, and the second session description information includes one of the following:

(1) the first session description information, that is, the second session description information included in the second mapping rule includes the first session description information in the first mapping rule;

(2) a default value, for example, the second session description information included in the second mapping rule is default; and (3) external slice information, for example, an external slice identifier (external slice ID), indicating that the second session description information in the second mapping rule corresponds to the external slice information.

In a possible implementation, the second mapping rule further includes an association relationship between second association information and the second session description information, and the second association information includes at least one of the following:

a source IP address;
a source IP address range;
a target IP address;
a target IP address range;
a source MAC address;
a source MAC address range;
a target MAC address;
a target MAC address range;
a service set identifier SSID;
a Bluetooth identifier;
a source port number;
a source port range;
a target port number;
a target port range;
protocol information of data; or
a default indication for indicating any data.

In a possible implementation, the second mapping rule further includes priority information, the priority information indicates a priority of the second mapping rule, and the first network function determines a priority of the corresponding first mapping rule based on a priority of each second mapping rule. In other words, one second mapping rule may determine one first mapping rule, and the priority of the first mapping rule corresponds to the priority of the corresponding second mapping rule.

In a possible implementation, when the second session description information includes the default value, that the first network function sends the first mapping rule to the first device based on the second mapping rule includes: determining, by the first network function according to a local policy, the first session description information corresponding to the second association information in the second information; and sending, by the first network function, the first mapping rule to the first device, where the first mapping rule includes the determined first session description information and/or the association relationship between the first session description information and the first association information (where in this possible implementation, the first association information is the second association information in the second information).

For example, the second session description information in the second mapping rule includes Default, and the first network function may determine, according to a local policy, a DNN and/or a network slice (for example, S-NSSAI) corresponding to the second association information in the second mapping rule.

In a possible implementation, when the second session description information includes the external slice information, that the first network function sends the first mapping rule to the first device based on the second mapping rule includes: obtaining, by the first network function, first session description information associated with the external slice information; and sending, by the first network function, the first mapping rule to the first device, where the first mapping rule includes the obtained first session description information and/or the association relationship between the obtained first session description information and the first association information (where in this possible implementation, the first association information is the second association information in the second information).

For example, the first network function may determine the first session description information (for example, the DNN and/or the network slice (the S-NSSAI)) by using the DNN/S-NSSAI associated with the external slice ID. The association relationship between the external slice ID and the DNN/S-NSSAI may be pre-configured in the first network function.

In a possible implementation, when the second information includes the mapping rule indication, that the first network function obtains the first mapping rule corresponding to the target identifier may include: sending, by the first network function based on the mapping rule indication in the second information, a mapping rule obtaining request carrying the target identifier to the third network function, and obtaining a mapping rule obtaining request reply sent by the third network function. The mapping rule obtaining request reply carries the first mapping rule corresponding to the target identifier.

For example, the first network function may send a PIN mapping rule obtaining request to UDR. The PIN mapping rule obtaining request includes a PEGC identifier, a PEMC identifier, or a group identifier, and may further include the external slice ID. The UDR receives the PIN mapping rule obtaining request, queries subscription information corresponding to the PEGC, the PEMC, or the group, takes into account a subscription relationship mapped between the PEGC identifier or the group identifier and the external slice ID, determines the PIN mapping rule or auxiliary information of the PIN mapping rule, and sends a PIN mapping rule obtaining request reply. The first network function receives the PIN mapping rule obtaining request reply of the UDR. The reply includes one or more PIN mapping rules or the auxiliary information of the PIN mapping rule. The auxiliary information includes the DNN/S-NSSAI and association information associated with the DNN/S-NSSAI.

Alternatively, when the second information includes the mapping rule indication, the first network function may also obtain, according to a local policy or pre-configuration information, the first mapping rule corresponding to the target identifier.

Figure 5:
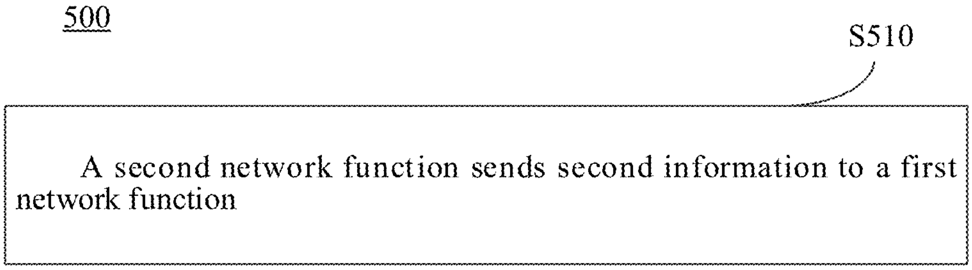
FIG. 5 is a schematic flowchart of another rule processing method according to an embodiment of this application.

Based on the same technical concept, the embodiments of this application further provide another rule processing method. FIG. 5 is a schematic flowchart of still another rule processing method according to an embodiment of this application. As shown in FIG. 5, the rule processing method 500 mainly includes the following steps.

S510: A second network function sends second information to a first network function.

The second information includes at least one of the following:

a mapping rule indication, where the mapping rule indication instructs the first network function to obtain a first mapping rule corresponding to a target identifier;

a second mapping rule, where the second mapping rule instructs the first network function to send the first mapping rule to the first device based on the second mapping rule;

a first allocation rule, where the first allocation rule is used by the first network function to indicate the first device to allocate, based on the first allocation rule, an IP address to a second device and/or send the IP address to the second device; and the second device interacts with the first device through a non-3GPP access technology.

In the embodiments of this application, the second network function may include a PINMF, and the first network function may include a PCF.

The second information in the embodiments of this application is the same as the second information in the method 400. For details, refer to related descriptions in the method 400.

In a possible implementation, the first allocation rule includes DHCP service address information or at least one of the following: address range information; or address mapping information, where the address mapping information includes at least one of the following: a correspondence between a MAC address and the IP address, a correspondence between the MAC address and an IP address range, or a correspondence between a MAC address range and the IP address range.

In a possible implementation, the mapping rule indication includes at least one of the following:

a terminal device identifier or a group identifier.

In a possible implementation, the second mapping rule includes second session description information, and the second session description information includes one of the following:

first session description information;

a default value; and external slice information.

In a possible implementation, the second mapping rule further includes an association relationship between second association information and the second session description information, and the second association information includes at least one of the following:

a source IP address;

a source IP address range;

a target IP address;

a target IP address range;

a source MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, the second mapping rule further includes priority information, the priority information indicates a priority of the second mapping rule, and the first network function determines a priority of the corresponding first mapping rule based on a priority of each second mapping rule.

In a possible implementation, when the first allocation rule includes the DHCP service address information, the DHCP service address information is related to the second network function, and the method may further include:

performing, by the second network function, a third operation based on information related to the second device, where the third operation includes at least one of the following:

allocating the IP address to the second device; or sending the IP address to the second device.

For example, if the second network function has a DHCP server function or the second network function and the DHCP server are in a same merged network element, the second network function includes the DHCP service address information in the first allocation rule, that is, the DHCP service address information indicates, through the first network function, the first device to forward a DHCP message sent by the second device to a DHCP server (where the DHCP server is the second network function in this possible implementation) corresponding to the DHCP service address information or to forward the DHCP message sent by the DHCP server corresponding to the DHCP service address information to the second device. In addition, the second network function may allocate the IP address to the second device and/or send the IP address to the second device according to information related to the second device, such as one or more of the MAC address of the second device, supported service information, a recommended QoS requirement, device type information, and the like.

When the second network function does not have the DHCP server function or the second network function and the DHCP server are respectively set in independent network elements, the second network function includes the DHCP service address information in the first allocation rule, that is, the DHCP service address information indicates, through the first network function, the first device to forward the DHCP message sent by the second device to the DHCP server corresponding to the DHCP service address information or forward the DHCP message sent by the DHCP server corresponding to the DHCP service address information to the second device. When receiving a first address obtaining request from a third network function (the DHCP server), the first network function allocates the IP address to the second device according to the information related to the second device and returns the IP address to the third network function.

In a possible implementation, the second network function may also perform the third operation based on the information related to the second device and with reference to the second mapping rule. For example, the second network function may determine second session description information corresponding to the data of the second device based on the information related to the second device and with reference to the second mapping rule, and allocate the IP address to the second device and/or send the IP address to the second device according to the second session description information.

For example, when the second network function has the DHCP server function or the second network function and the DHCP server are in a same merged network element, the second network function may determine, after receiving a DHCP message of a PIN device, a type of the PIN device and one or more of a corresponding DNN/network slice, an IP range, and the like according to a MAC address of the PIN device, and then send an IP address or an IP range of the PIN device to the PIN device according to the information.

When the second network function does not have the DHCP server function or the second network function and the DHCP server are respectively set in the independent network elements, the second network function may receive the first address obtaining request from the third network function (the DHCP server). The first address obtaining request includes MAC addresses of one or more PIN devices. The second network function determines a type of the PIN device, and at least one of a corresponding DNN/network slice, an IP range, and the like based on the MAC address, and then sends a first address obtaining request reply to the third network function according to the information. The reply message includes the IP address or the IP range of the PIN device.

Through the technical solution provided in the embodiments of this application, data of different second devices may be mapped to corresponding PDU sessions, that is, the data of the second device is correctly processed; and in addition, the IP address of the second device may be further correctly allocated.

The following uses the personal internet of things as an example, to describe the technical solution provided in the embodiments of this application.

Figure 6:
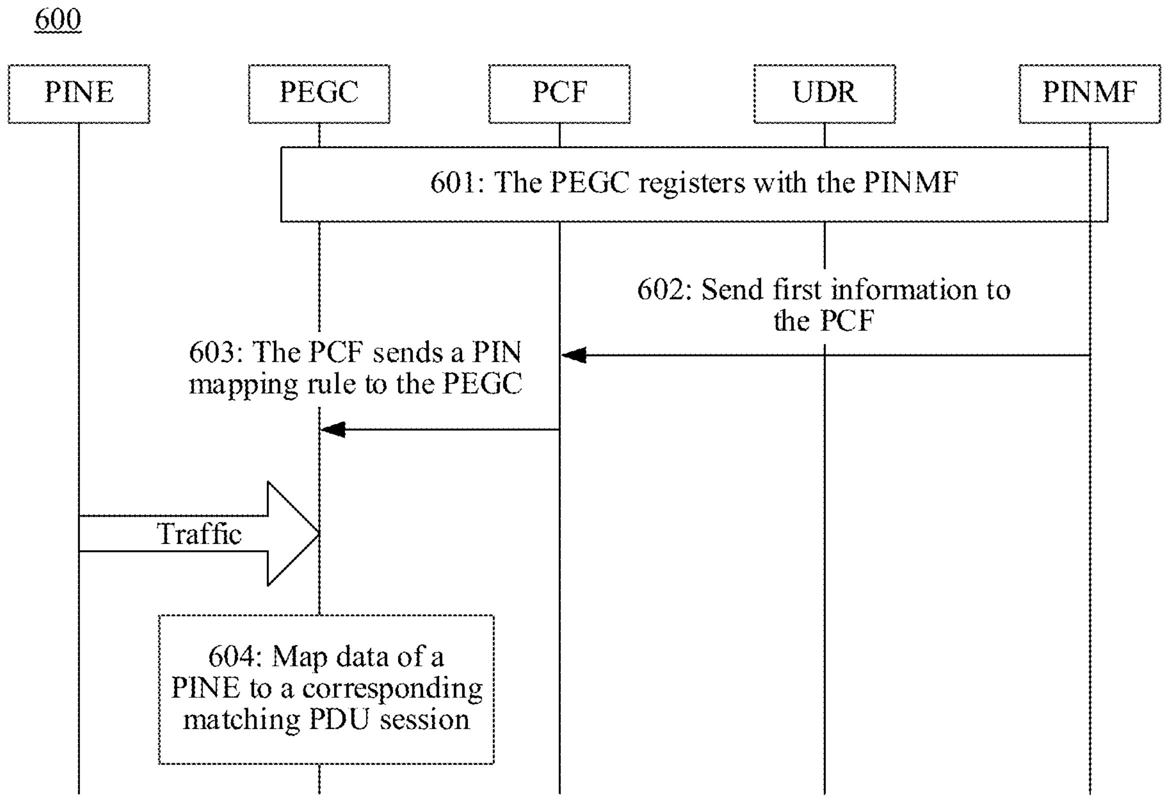
FIG. 6 is a schematic flowchart of a PIN mapping rule processing method according to an embodiment of this application.

FIG. 6 is a schematic flowchart of a PIN mapping rule processing method according to an embodiment of this application. As shown in FIG. 6, the method mainly includes the following steps.

Step 601: A PEGC registers with a PINMF.

Step 602: The PINMF sends first information to a PCF. The first information includes at least one of the following:

(1) one or more PIN mapping rules, where the PIN mapping rules are used by the PEGC to determine an association between traffic accessing a PIN device and a PDU session, and the PIN mapping rules include any one of the following: PDU session parameters (a DNN/S-NSSAI/SSC mode/PDU session type, and the like), Default, and an external slice, and may further include association information corresponding to the foregoing, where the association information includes at least one of the following: a source IP range, an SSID, a BT ID, and a Packet filter; or (2) a PIN mapping rule obtaining indication, where the indication includes a PEGC identifier, a PIN element with management capability (PIN Element with Management Capability, PEMC) identifier, or a group identifier.

In the embodiments of this application, when the first information may include a plurality of PIN mapping rules, the plurality of PIN mapping rules have priorities. In addition, when the PIN mapping rules include default information, the first information includes only one PIN mapping rule.

Step 603: The PCF sends the PIN mapping rules to the PEGC.

In an implementation, when the first information includes one or more PIN mapping rules, and the PIN mapping rules do not include a default indication and an external slice/service identifier indication, the PCF forwards the first information to the PEGC.

In another implementation, when the PIN mapping rule included in the first information includes the default indication (that is, there is only one PIN mapping rule), the PCF determines the PDU session parameters (the DNN and the slice (the S-NSSAI)) of the PIN mapping rule, and sends the determined PIN mapping rule to the PEGC.

In still another implementation, when the PIN mapping rule included in the first information includes the external slice indication, the PCF determines the PDU session parameters (the DNN and the slice (the S-NSSAI)) in the PIN mapping rule by using the DNN/S-NSSAI associated with the external slice ID. An association relationship between the external slice ID and the DNN/S-NSSAI may be pre-configured in the PCF. The PCF sends the determined PIN mapping rule to the PEGC.

In still another implementation, when the first information includes the PIN mapping rule obtaining indication, in step 602, the PCF sends the PIN mapping rule obtaining request to the UDR. The PIN mapping rule obtaining request includes the PEGC identifier, the PEMC identifier, or the group identifier, may further include the external slice ID, and then receives a PIN mapping rule obtaining request reply from the UDR. The reply includes one or more PIN mapping rules or auxiliary information of the PIN mapping rules. The auxiliary information includes the DNN/S-NSSAI and association information associated with the DNN/S-NSSAI. In step 603, the PCF determines one or more PIN mapping rules according to reply information and sends the one or more PIN mapping rules to the PEGC. Alternatively, the PCF may also determine the one or more PIN mapping rules according to a local policy or pre-configuration information and send the one or more PIN mapping rules to the PEGC.

Step 604: The PEGC receives the PIN mapping rules sent by the PCF, and maps data of the PINE to a correspondingly matching PDU session according to the PIN mapping rule. If there is no matching PDU session currently, the PEGC establishes a new PDU session based on the PIN mapping rule.

Figure 7:
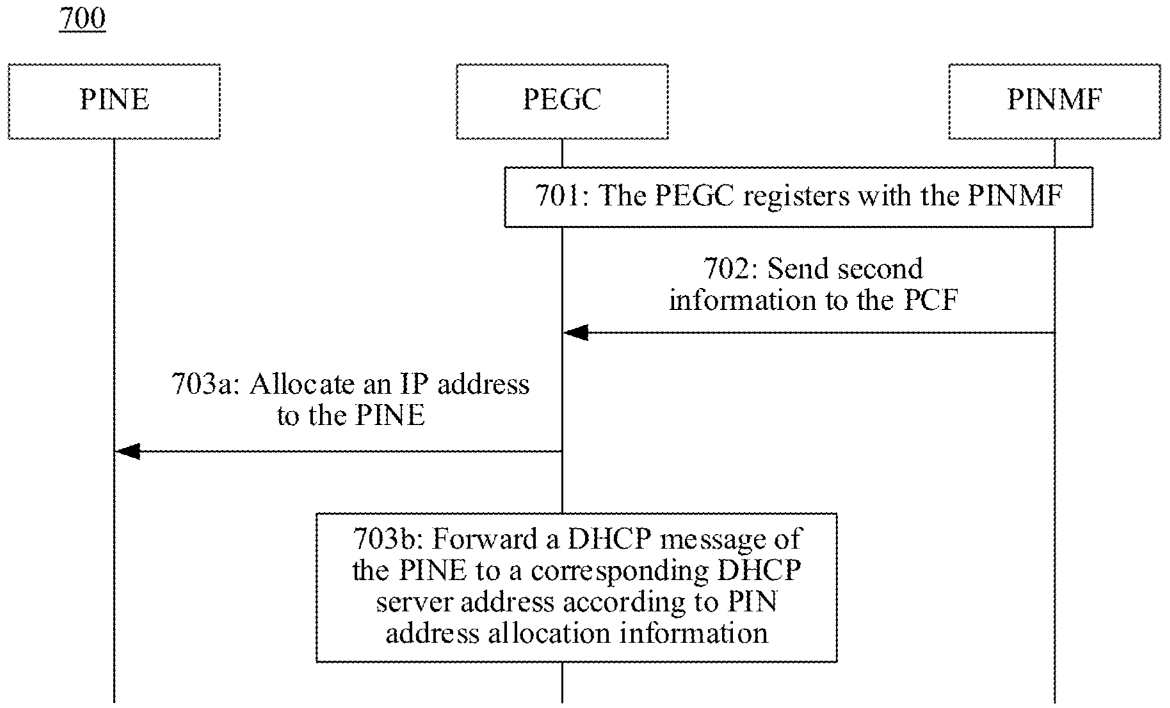
FIG. 7 is a schematic flowchart of an address allocation rule processing method according to an embodiment of this application.

FIG. 7 is a schematic flowchart of an address allocation rule processing method according to an embodiment of this application. As shown in FIG. 7, the method 700 mainly includes the following steps.

Step 701: A PEGC registers with a PINMF.

Step 702: The PINMF sends second information to a PCF, where first information includes PIN address allocation information (PIN Address Allocation Info), and the PIN address allocation information includes at least one of the following:

(1) an IP range, where the IP range is used by a PEGC to allocate an IP address to an accessed PIN device; or (2) a DHCP server address, where the DHCP server address is used by the PEGC to relay a DHCP message of the PIN device.

Step 703*a*: When the PIN address allocation information includes the IP range, the PEGC allocates the IP address to the PINE based on the IP range.

Step 703*b*: When the PIN address allocation information includes the DHCP server address, the PEGC forwards the DHCP message of the PINE to a corresponding DHCP server address according to the PIN address allocation information.

Figure 8:
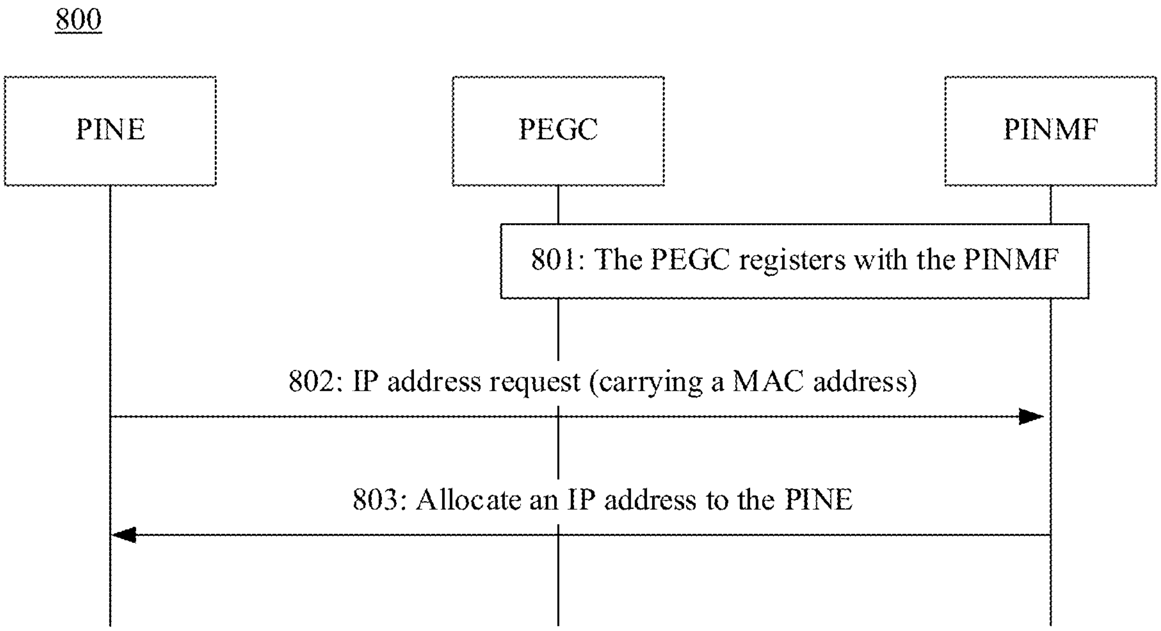
FIG. 8 is a schematic flowchart of another address allocation rule processing method according to an embodiment of this application.

FIG. 8 is a schematic flowchart of another address allocation rule processing method according to an embodiment of this application. As shown in FIG. 8, the method 800 mainly includes the following steps.

Step 801: A PEGC registers with a PINMF.

In the embodiments of this application, the PINMF and a DHCP server are co-deployed.

Step 802: The PINMF receives an IP address request (carrying a MAC address) sent by a PINE via a DHCP message.

Step 803: The PINMF determines a type of the PIN device, and information such as a corresponding DNN/slice, an IP range, and the like according to the MAC address of the PIN device, and then sends an IP address or an IP range of the PIN device to the PIN device.

Figure 9:
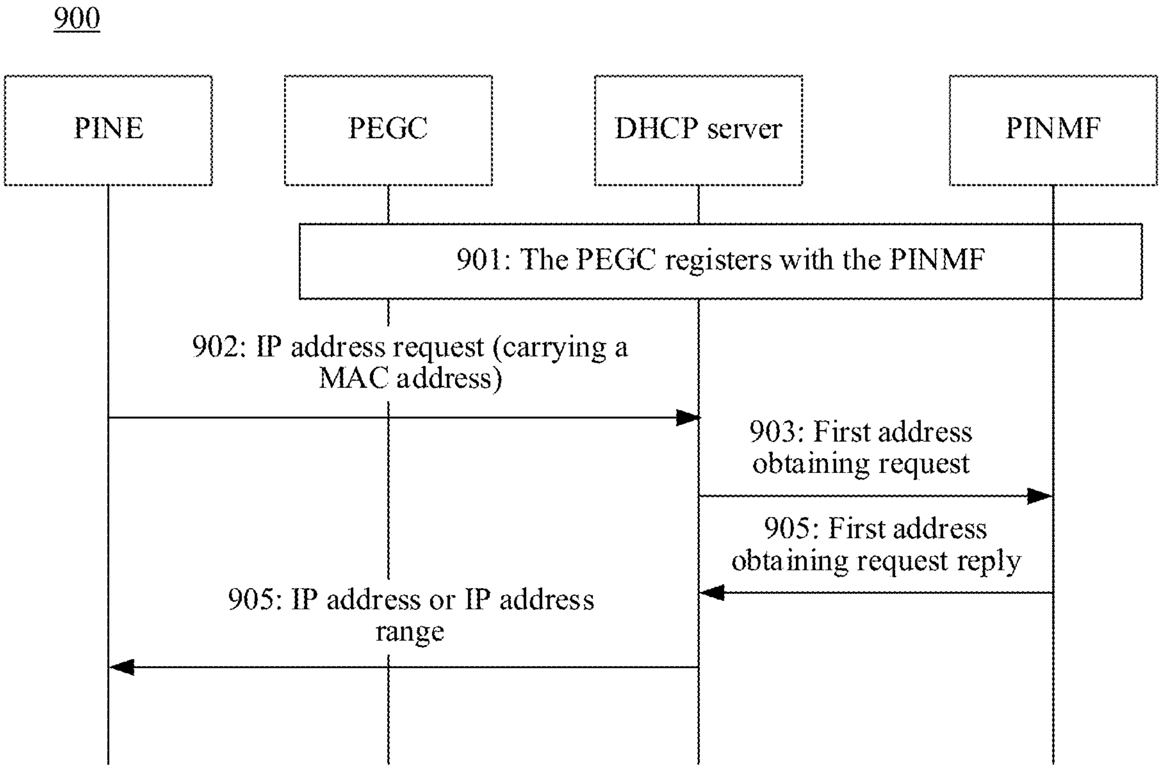
FIG. 9 is a schematic flowchart of another address allocation rule processing method according to an embodiment of this application.

FIG. 9 is a schematic flowchart of still another address allocation rule processing method according to an embodiment of this application. As shown in FIG. 9, the method 900 mainly includes the following steps.

Step 901: A PEGC registers with a PINMF.

A difference between this method and the method 800 is that in this method, the PINMF and a DHCP server are not co-deployed but are independent network elements.

Step 902: The DHCP server receives an IP address request from a PINE, where the request carries a MAC address.

Step 903: The DHCP server sends a first address obtaining request to the PINMF, where the request carries the MAC address of the PINE.

Step 904: The PINMF determines a type of the PIN device, and information such as a corresponding DNN/slice, an IP range, and the like according to the MAC address of the PIN device, and then sends a first address obtaining request reply to the DHCP server, where the reply carries an IP address or an IP range of the PIN device.

Step 905: The DHCP server sends the IP address or the IP address range of the PIN device to the PIN device.

In the rule processing method provided in the embodiments of this application, an execution entity may be a rule processing apparatus. In the embodiments of this application, that the rule processing apparatus performs the rule processing method is used as an example to describe the rule processing apparatus provided in the embodiments of this application.

Figure 10:
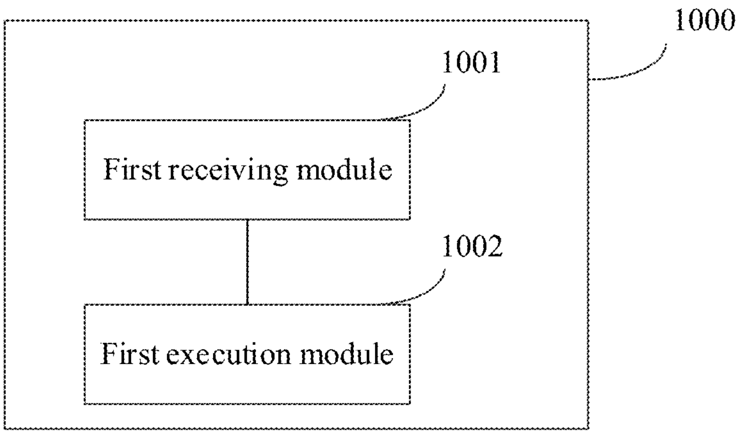
FIG. 10 is a schematic diagram of a structure of a rule processing apparatus according to an embodiment of this application.

FIG. 10 is a schematic diagram of a structure of a rule processing apparatus according to an embodiment of this application. The apparatus may be applied to a first device. As shown in FIG. 10, the apparatus 1000 mainly includes: a first receiving module 1001 and a first execution module 1002.

In the embodiments of this application, the first receiving module 1001 is configured to receive first information sent by a network side, where the first information includes at least one of the following: a first mapping rule or a first allocation rule; and the first execution module 1002 is configured to perform a first operation based on the first information, where the first operation includes at least one of the following: forwarding data sent by a second device to a network side device; allocating an IP address to the second device; or sending the IP address to the second device, where the second device interacts with the first device through a non-3GPP access technology.

In a possible implementation, that the first execution module 1002 performs the first operation based on the first information includes at least one of the following: transmitting the data through a target protocol data unit PDU session based on the first mapping rule; and allocating, based on the first allocation rule, the IP address to the second device and/or sending the IP address to the second device.

In a possible implementation, the first allocation rule includes dynamic host configuration protocol DHCP service address information or at least one of the following:

address range information; or address mapping information, where the address mapping information includes any one of the following:

a correspondence between a MAC address and the IP address;

a correspondence between the MAC address and an IP address range; and a correspondence between a MAC address range and the IP address range.

In a possible implementation, the first mapping rule includes first session description information, and the first session description information includes at least one of the following:

a data network name DNN;

information related to a network slice; or service continuity mode information.

In a possible implementation, the first mapping rule further includes an association relationship between first association information and the first session description information, and the first association information includes at least one of the following:

a source IP address;

a source IP address range;

a target IP address;

a target IP address range;

a source media access control MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, that the first execution module 1002 transmits the data through a target PDU session based on the first mapping rule includes:

transmitting the data through the target PDU session based on the first mapping rule and data attribute information of the data, where the target PDU session corresponds to the first session description information.

In a possible implementation, the data attribute information includes at least one of the following:

a source IP address;

a target IP address;

the SSID used by the second device when connecting to the first device;

the Bluetooth identifier used by the second device when connecting to the first device;

a source MAC address;

a target MAC address;

a source port number;

a target port number;

the protocol information of the data.

In a possible implementation, the first mapping rule may further include priority information, the priority information indicates a priority of the first mapping rule, and when there are a plurality of first mapping rules, the first device uses the first mapping rule based on priorities of the first mapping rules.

In a possible implementation, when the first allocation rule includes the DHCP service address information, that the first execution module 1002 performs the first operation based on the first allocation rule includes: forwarding a DHCP message sent by the second device to a DHCP server indicated by the DHCP service address information, or forwarding a DHCP message sent by a DHCP server to the second device.

In a possible implementation, the target PDU session includes:

an established target PDU session; or a newly established target PDU session.

The rule processing apparatus in the embodiments of this application may be an electronic device, for example, an electronic device having an operating system, or may be a component in the electronic device, for example, an integrated circuit or a chip. The electronic device may be a terminal, or may be a device other than the terminal. For example, the terminal may include, but is not limited to, a type of the terminal 11 listed above. Another device may be a server, a Network Attached Storage (NAS), or the like. This is not specifically limited in the embodiments of this application.

The rule processing apparatus provided in the embodiments of this application may implement various processes of the method embodiment in FIG. 3, and achieve the same technical effect, which will not be described in detail herein again to avoid repetition.

Figure 11:
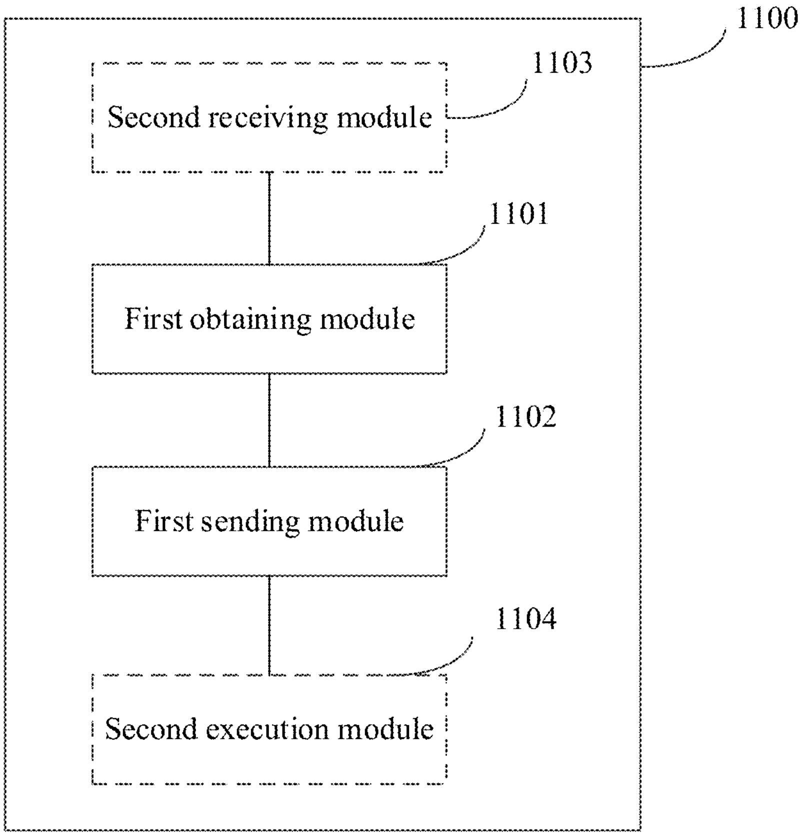
FIG. 11 is a schematic diagram of another structure of a rule processing apparatus according to an embodiment of this application.

FIG. 11 is a schematic diagram of still another structure of a rule processing apparatus according to an embodiment of this application. As shown in FIG. 11, the apparatus 1100 mainly includes: a first obtaining module 1101 and a first sending module 1102.

In the embodiments of this application, a first obtaining module 1101 is configured to obtain first information, where the first information includes at least one of the following: a first mapping rule or a first allocation rule; and a first sending module 1102, configured to send first information to a first device, where the first mapping rule instructs the first device to forward, based on the first mapping rule, data sent by a second device to a network side device; the first allocation rule instructs the first device to allocate, based on the first allocation rule, an IP address to the second device and/or send the IP address to the second device; and the second device interacts with the first device through a non-3GPP access technology.

In a possible implementation, the first allocation rule includes DHCP service address information or at least one of the following:

address range information; or address mapping information, where the address mapping information includes any one of the following: a correspondence between a MAC address and an IP address, a correspondence between the MAC address and an IP address range, and a correspondence between a MAC address range and the IP address range.

In a possible implementation, the first mapping rule includes first session description information, and the first session description information includes at least one of the following:

a data network name DNN;

information related to a network slice; or service continuity mode information.

In a possible implementation, the first mapping rule further includes an association relationship between first association information and the first session description information, and the first association information includes at least one of the following:

a source IP address;

a source IP address range;

a target IP address;

a target IP address range;

a source MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, the first mapping rule may further include priority information, the priority information indicates a priority of the first mapping rule, and when there are a plurality of first mapping rules, the first device uses the first mapping rule based on priorities of the first mapping rules.

In a possible implementation, as shown in FIG. 11, the apparatus may further include: a second receiving module 1103, configured to receive second information from a second network function, where the second information includes at least one of the following:

a mapping rule indication;

a second mapping rule; or the first allocation rule, where the mapping rule indication instructs the first network function to obtain a first mapping rule corresponding to a target identifier; and the second mapping rule indicates the first network function to send the first mapping rule to the first device based on the second mapping rule.

In a possible implementation, the mapping rule indication includes at least one of the following target identifiers: a terminal device identifier or a group identifier.

In a possible implementation, the second mapping rule includes second session description information, and the second session description information includes one of the following:

first session description information;

a default value; and external slice information.

In a possible implementation, the second mapping rule further includes an association relationship between second association information and the second session description information, and the second association information includes at least one of the following:

a source IP address;

a source IP address range;

a target IP address;

a target IP address range;

a source MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, the second mapping rule further includes priority information, the priority information indicates a priority of the second mapping rule, and the first network function determines a priority of the corresponding first mapping rule based on a priority of each second mapping rule.

In a possible implementation, as shown in FIG. 11, the apparatus may further include a second execution module 1104, configured to perform, when the first allocation rule includes the DHCP service address information, a second operation based on the information related to the second device, where the second operation includes at least one of the following:

allocating the IP address to the second device; or sending the IP address to the second device.

In a possible implementation, that the second execution module 1104 performs the second operation based on the information related to the second device includes: performing the second operation based on the information related to the second device and with reference to the first mapping rule.

The rule processing apparatus provided in the embodiments of this application may implement various processes of the method embodiment in FIG. 4, and achieve the same technical effect, which will not be described in detail herein again to avoid repetition.

Figure 12:
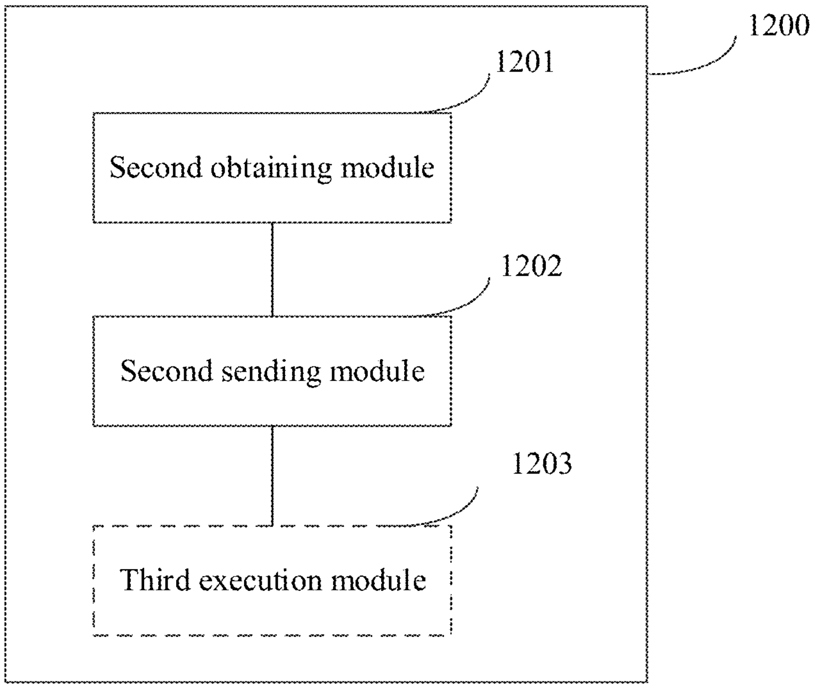
FIG. 12 is a schematic diagram of another structure of a rule processing apparatus according to an embodiment of this application.

FIG. 12 is a schematic diagram of still another structure of a rule processing apparatus according to an embodiment of this application. As shown in FIG. 12, the apparatus 1200 mainly includes: a second obtaining module 1201 and a second sending module 1202.

In the embodiments of this application, the second obtaining module 1201 is configured to obtain second information; and the second sending module 1202 is configured to send the second information to a first network function, where the second information includes at least one of the following: a mapping rule indication; a second mapping rule; or a first allocation rule, where the mapping rule indication instructs the first network function to obtain a first mapping rule corresponding to a target identifier; the second mapping rule indicates the first network function to send the first mapping rule to a first device based on the second mapping rule; the first allocation rule is used by the first network function to indicate the first device to allocate, based on the first allocation rule, an IP address to a second device and/or send the IP address to the second device; and the second device interacts with the first device through a non-3GPP access technology.

In a possible implementation, the first allocation rule includes DHCP service address information or at least one of the following:

address range information; or address mapping information, where the address mapping information includes at least one of the following: a correspondence between a MAC address and the IP address, a correspondence between the MAC address and an IP address range, or a correspondence between a MAC address range and the IP address range.

In a possible implementation, the mapping rule indication includes at least one of the following:

a terminal device identifier or a group identifier.

In a possible implementation, the second mapping rule includes second session description information, and the second session description information includes one of the following:

first session description information;

a default value; and external slice information.

In a possible implementation, the second mapping rule further includes an association relationship between second association information and the second session description information, and the second association information includes at least one of the following:

a source IP address;

a source IP address range;

a target IP address;

a target IP address range;

a source MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

In a possible implementation, the second mapping rule further includes priority information, the priority information indicates a priority of the second mapping rule, and the first network function determines a priority of the corresponding first mapping rule based on a priority of each second mapping rule.

In a possible implementation, as shown in FIG. 12, the apparatus may further include a third execution module 1203, configured to perform, when the first allocation rule includes the DHCP service address information, a third operation based on the information related to the second device, where the third operation includes at least one of the following:

allocating the IP address to the second device; or sending the IP address to the second device.

In a possible implementation, that the third execution module 1203 performs the third operation based on the information related to the second device includes: performing the third operation based on the information related to the second device and with reference to the second mapping rule.

The rule processing apparatus provided in the embodiments of this application may implement various processes of the method embodiment in FIG. 5, and achieve the same technical effect, which will not be described in detail herein again to avoid repetition.

Figure 13:
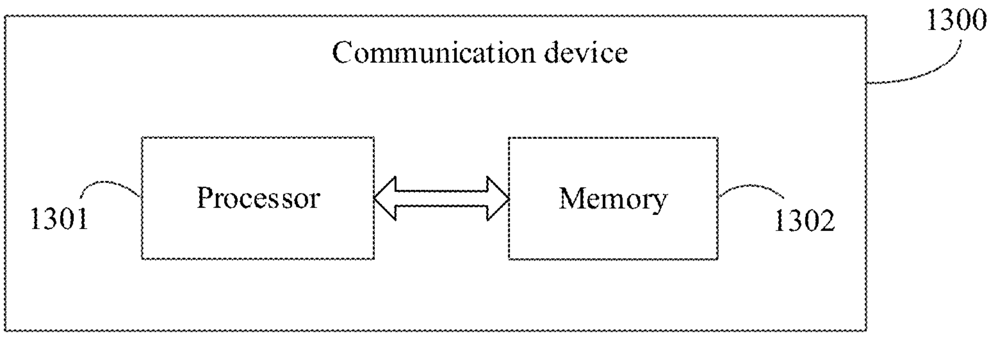
FIG. 13 is a schematic diagram of a structure of a communication device according to an embodiment of this application.

Optionally, as shown in FIG. 13, an embodiment of this application further provides a communication device 1300, including a processor 1301 and a memory 1302, where a program or instructions, executable on the processor 1301, are stored in the memory 1302. For example, when the communication device 1300 is a terminal, the program or the instructions, when executed by the processor 1301, implement the various steps of the rule processing method 300 embodiment, and may achieve the same technical effect. When the communication device 1300 is a network side device, various steps of the rule processing method 400 or 500 embodiment is implemented when the program or instructions are executed by the processor 1301, and can achieve the same technical effect, which will not be described in detail herein again to avoid repetition.

Figure 14:
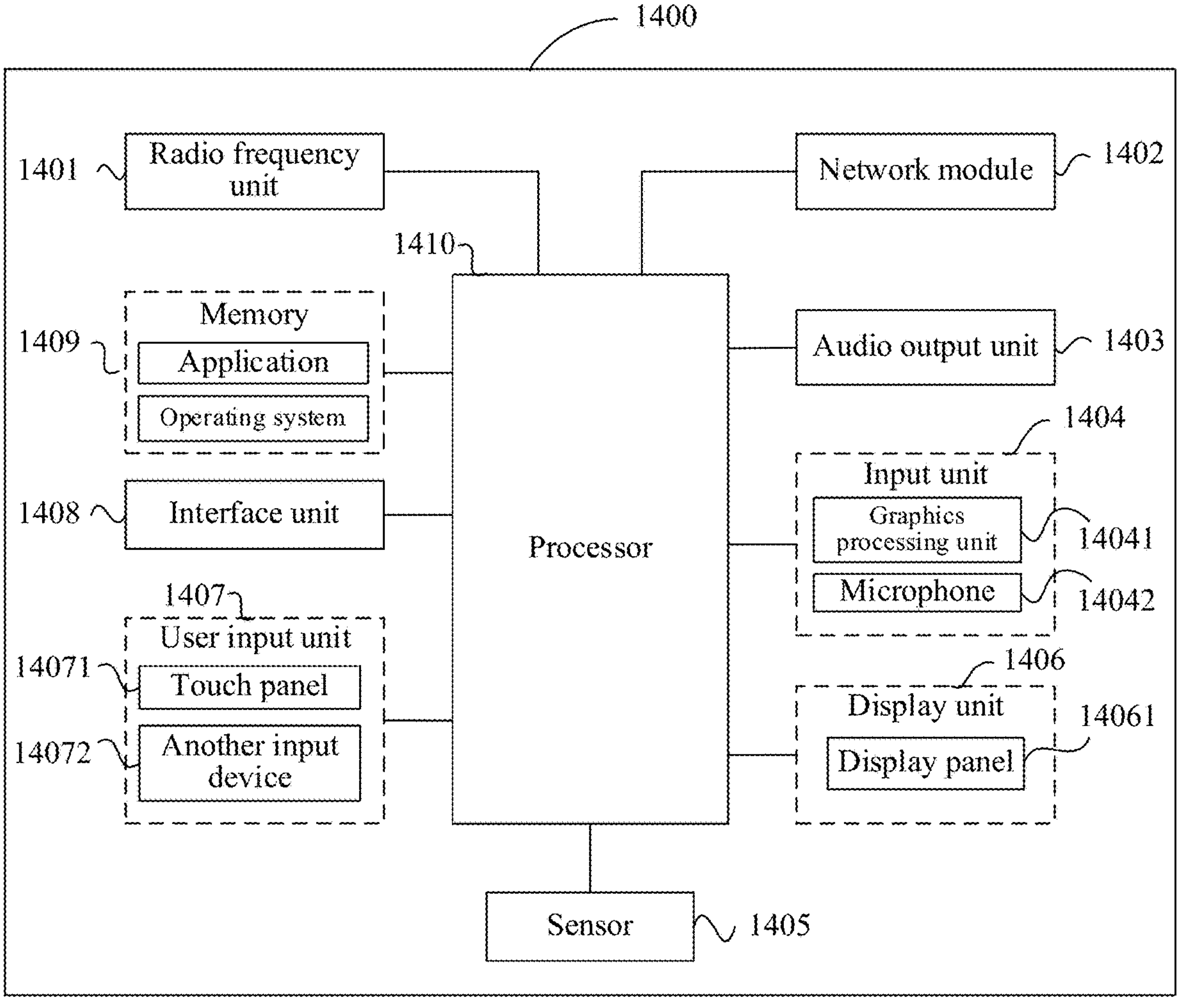
FIG. 14 is a schematic diagram of a hardware structure of a terminal according to an embodiment of this application.

Embodiments of this application further provide a terminal, including a processor and a communication interface. The processor is configured to implement the various steps of the foregoing rule processing method 300 embodiment, and the communication interface is configured for communicating with an external device. This terminal embodiment corresponds to the first device side method embodiment. Each implementation process and implementation of the method embodiment may be applied to the terminal embodiment, and can achieve the same technical effect. Specifically, FIG. 14 is a schematic diagram of a hardware structure of a terminal according to an embodiment of this application.

The terminal 1400 includes, but is not limited to, at least a part of components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the terminal 1400 may further include the power supply (such as a battery) for supplying power to the components. The power supply may be logically connected to the processor 1410 by a power management system, thereby implementing functions such as charging, discharging, and power consumption management by using the power management system. A terminal structure shown in FIG. 14 does not constitute a limitation to the terminal, and the terminal may include more or fewer components than those shown in the figure, or some components may be combined, or a different component deployment may be used, and details are not repeated herein.

It should be understood that, in the embodiments of this application, the input unit 1404 may include a Graphics Processing Unit (GPU) 14041 and a microphone 14042. The GPU 14041 performs processing on image data of a static picture or a video that is obtained by an image acquisition apparatus (for example, a camera) in a video acquisition mode or an image acquisition mode. The display unit 1406 may include a display panel 14061, and the display panel 14061 may be configured by using a liquid crystal display, an organic light-emitting diode, or the like. The user input unit 1407 includes at least one of a touch panel 14071 and another input device 14072. The touch panel 14071 is also referred to as a touchscreen. The touch panel 14071 may include two parts: a touch detection apparatus and a touch controller. The another input device 14072 may include, but not limited to, a physical keyboard, a functional key (such as a volume control key or a switch key), a track ball, a mouse, and a joystick, which are not described herein in detail.

In the embodiments of this application, after receiving downlink data from the network side device, the radio frequency unit 1401 may transmit the downlink data to the processor 1410 for processing. In addition, the radio frequency unit 1401 may transmit uplink data to the network side device. Generally, the radio frequency unit 1401 includes, but is not limited to, an antenna, an amplifier, a transceiver, a coupler, a low noise amplifier, a duplexer, and the like.

The memory 1409 may be configured to store a software program or instructions and various data. The memory 1409 may mainly include a first storage area storing a program or instructions and a second storage area storing data. The first storage area may store an operating system, an application program or instructions required by at least one function (such as a sound playback function and an image display function), and the like. In addition, the memory 1409 may include a volatile memory or a non-volatile memory, or the memory 1409 may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synch link dynamic random access memory (Synch link DRAM, SLDRAM), and a direct rambus random access memory (Direct Rambus RAM, DR RAM). The memory 1409 in this embodiment of this application includes but is not limited to these memories and any other suitable types of memories.

The processor 1410 may include one or more processing units; and optionally, the processor 1410 integrates an application processor and a modem processor. The application processor mainly processes operations relating to an operating system, a user interface, an application program, and the like. The modem processor mainly processes a wireless communication signal, such as a baseband processor. It may be understood that, the foregoing modem processor may either not be integrated into the processor 1410.

The radio frequency unit 1401 is configured to receive first information sent by a network side, where the first information includes at least one of the following: a first mapping rule or a first allocation rule. The terminal performs a first operation based on the first information, where the first operation includes at least one of the following:

forwarding data sent by a second device to a network side device;

allocating an IP address to the second device; or sending the IP address to the second device, where the second device interacts with the terminal through a non-3GPP access technology.

Embodiments of this application further provide a network side device, including a processor and a communication interface. The processor is configured to implement the various steps of the foregoing rule processing method 400 or 500 embodiment, and the communication interface is configured for communicating with an external device. The network side device embodiment corresponds to the first network function or second network function method embodiment. Each implementation process and implementation of the method embodiment are applicable to the network side device embodiment, and may achieve the same technical effect.

Figure 15:
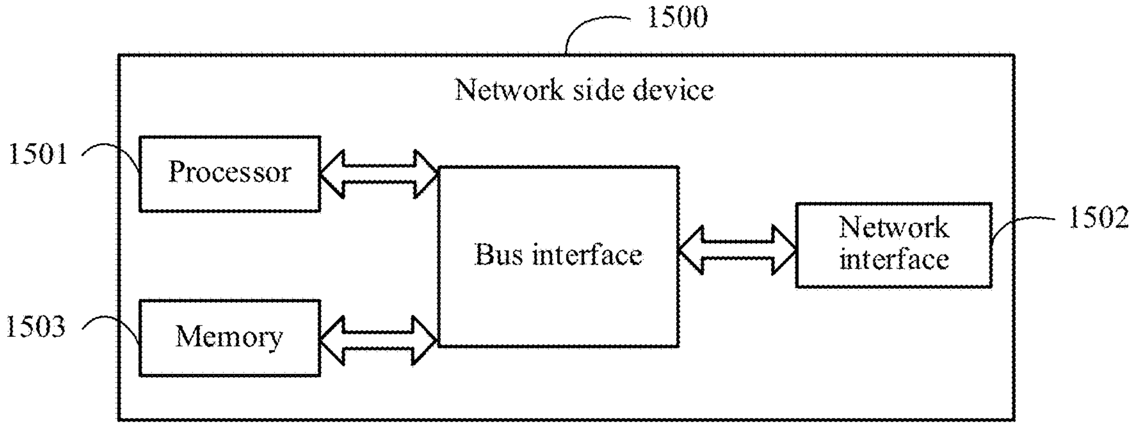
FIG. 15 is a schematic diagram of a hardware structure of a network side device according to an embodiment of this application.

Specifically, embodiments of this application further provide a network side device. As shown in FIG. 15, the network side device 1500 includes: a processor 1501, a network interface 1502, and a memory 1503. The network interface 1502 is, for example, a common public radio interface (CPRI).

Specifically, the network side device 1500 in the embodiments of the present invention further includes: instructions or a program stored in the memory 1503 and executable on the processor 1501. The processor 1501 invokes the instructions or program in the memory 1503 to perform the method performed by each module shown in FIG. XX, and achieves the same technical effect, which will not be described in detail herein again to avoid repetition.

Embodiments of this application further provide a readable storage medium, where the readable storage medium stores a program or instructions. The program or the instructions, when executed by a processor, implement the various processes of the rule processing method embodiment, and may achieve the same technical effect, which will not be described in detail herein again to avoid repetition.

The processor is a processor in the terminal described in the foregoing embodiment. The readable storage medium may be either non-volatile or non-transient. The readable storage medium may include a computer-readable storage medium, for example, a computer read-only memory ROM, a random access memory RAM, a magnetic disk, or an optical disc.

Embodiments of this application further provide a chip. The chip includes a processor and a communication interface. The communication interface is coupled to the processor. The processor is configured to run a program or instructions, to implement various processes of the rule processing method embodiment, and can achieve the same technical effect, which will not be described in detail herein again to avoid repetition.

It should be understood that, the chip mentioned in embodiments of this application may be further referred to as a system-level chip, a system chip, a chip system, a system-on-chip, or the like.

The embodiments of this application further provide a computer program/program product, where the computer program/program product is stored in a storage medium, and the computer program/program product is executed by at least one processor to implement various processes of the rule processing method embodiment, and can achieve the same technical effect, which will not be described in detail herein again to avoid repetition.

The embodiments of this application further provide a rule processing system, including a terminal and a network side device. The terminal can be configured to perform the steps of the rule processing method 300, the network side device includes a first network side device and/or a second network side device, the first network side device can be configured to perform the steps of the rule processing method 400, and the second network side device can be configured to perform the steps of the rule processing method 500.

It should be noted that, in this specification, the terms "include", "comprise" or any other variants mean to cover the non-exclusive inclusion, so that the processes, methods, objects, or apparatuses which include a series of elements not only include those elements, but also include other elements which are not clearly listed, or include inherent elements of the processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Although embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A rule processing method, comprising:

receiving, by a first device, first information sent by a first network function, wherein the first information comprises: a first mapping rule; and the first information is used by the first device to perform a first operation based on the first information, wherein the first operation comprises:

forwarding data sent by a second device to a network side device;

wherein the second device interacts with the first device through a non-3GPP access technology, and wherein the first mapping rule is used to determine a target protocol data unit PDU session corresponding to the second device, and the forwarding, by the first device based on the first information, data sent by a second device to a network side device comprises:

transmitting, by the first device, the data through the target PDU session based on the first mapping rule.

2. The method according to claim 1, wherein the first mapping rule comprises first session description information, and the first session description information comprises at least one of the following:

a data network name DNN;

information related to a network slice; or service continuity mode information.

3. The method according to claim 2, wherein the first mapping rule further comprises an association relationship between first association information and the first session description information, and the first association information comprises at least one of the following:

a source IP address;

a source IP address range;

a target IP address;

a target IP address range;

a source media access control MAC address;

a source MAC address range;

a target MAC address;

a target MAC address range;

a service set identifier SSID;

a Bluetooth identifier;

a source port number;

a source port range;

a target port number;

a target port range;

protocol information of data; or a default indication for indicating any data.

4. The method according to claim 2, wherein the transmitting, by the first device based on the first mapping rule, the data through the target PDU session comprises:

transmitting, by the first device, the data through the target PDU session based on the first mapping rule and data attribute information of the data, wherein the target PDU session corresponds to the first session description information.

5. The method according to claim 4, wherein the data attribute information comprises at least one of the following:

a source IP address;

a target IP address;

an SSID used by the second device when connecting to the first device;

a Bluetooth identifier used by the second device when connecting to the first device;

a source MAC address;
a target MAC address;
a source port number;
a target port number; or
protocol information of the data.

6. The method according to claim 1, wherein the first mapping rule further comprises priority information, the priority information indicates a priority of the first mapping rule, and when there are a plurality of first mapping rules, the first device uses the first mapping rule based on priorities of the first mapping rules.

7. The method according to claim 1, wherein the target PDU session comprises:
an established target PDU session; or
a newly established target PDU session.

8. A rule processing method, comprising:
sending, by a first network function, first information to a first device, wherein the first information comprises: a first mapping rule, wherein
the first mapping rule instructs the first device to forward, based on the first mapping rule, data sent by a second device to a network side device;
the second device interacts with the first device through a non-3GPP access technology,
wherein the first mapping rule is used to determine a target protocol data unit PDU session corresponding to the second device, and
forwarding, by the first device based on the first information, the data sent by the second device to the network side device comprises:
transmitting, by the first device, the data through the target PDU session based on the first mapping rule.

9. The method according to claim 8, wherein the first mapping rule comprises first session description information, and the first session description information comprises at least one of the following:
a data network name DNN;
information related to a network slice; or
service continuity mode information.

10. The method according to claim 9, wherein the first mapping rule further comprises an association relationship between first association information and the first session description information, and the first association information comprises at least one of the following:
a source IP address;
a source IP address range;
a target IP address;
a target IP address range;
a source MAC address;
a source MAC address range;
a target MAC address;
a target MAC address range;
a service set identifier SSID;
a Bluetooth identifier;
a source port number;
a source port range;
a target port number;
a target port range;
protocol information of data; or
a default indication for indicating any data.

11. The method according to claim 8, wherein the first mapping rule further comprises priority information, the priority information indicates a priority of the first mapping rule, and when there are a plurality of first mapping rules, the first device uses the first mapping rule based on priorities of the first mapping rules.

12. The method according to claim 8, wherein before the sending, by a first network function, first information to a first device, the method further comprises:
receiving, by the first network function, second information from a second network function, wherein the second information comprises at least one of the following:
a mapping rule indication;
a second mapping rule; wherein
the mapping rule indication instructs the first network function to obtain a first mapping rule corresponding to a target identifier; and
the second mapping rule instructs the first network function to send the first mapping rule to the first device based on the second mapping rule.

13. The method according to claim 12, wherein the mapping rule indication comprises at least one of the following target identifiers:
a terminal device identifier or a group identifier.

14. The method according to claim 12, wherein the second mapping rule comprises second session description information, and the second session description information comprises at least one of the following:
first session description information;
a default value; or
external slice information.

15. The method according to claim 14, wherein the second mapping rule further comprises an association relationship between second association information and the second session description information, and the second association information comprises at least one of the following:
a source IP address;
a source IP address range;
a target IP address;
a target IP address range;
a source MAC address;
a source MAC address range;
a target MAC address;
a target MAC address range;
a service set identifier SSID;
a Bluetooth identifier;
a source port number;
a source port range;
a target port number;
a target port range;
protocol information of data; or
a default indication for indicating any data.

16. The method according to claim 14, wherein the second mapping rule further comprises priority information, the priority information indicates a priority of the second mapping rule, and the first network function determines a priority of the corresponding first mapping rule based on a priority of each second mapping rule.

17. A communication device, comprising a processor and a memory, wherein the memory stores a program or instructions executable on the processor, and the program or the instructions, when executed by the processor, implement a rule processing method, the method comprising:
receiving, by a first device, first information sent by a first network function, wherein the first information comprises: a first mapping rule; and
the first information is used by the first device to perform a first operation based on the first information, wherein the first operation comprises:
forwarding data sent by a second device to a network side device; wherein the second device interacts with the first device through a non-3GPP access technology, wherein the first mapping rule is used to determine a target protocol data unit PDU session corresponding to the second device, and forwarding, by the first device based on the first information, the data sent by the second device to the network side device comprises:

transmitting, by the first device, the data through the target PDU session based on the first mapping rule.

18. The communication device according to claim 17, wherein the first mapping rule comprises first session description information, and the first session description information comprises at least one of the following:

a data network name DNN;

information related to a network slice; or service continuity mode information.

* * * * *